Patented Jan. 30, 1951

2,539,801

UNITED STATES PATENT OFFICE 2,539,801

PHENYL-OXO-AMINOALKYNES

John O. Van Hook, Roslyn, and Willard J. Croxall, Bryn Athyn, Pa., assignors to Rohm & Haas Company, Philadelphia, Pa., a corporation of Delaware No Drawing. Application July 2, 1949, Serial No. 102,934

8 Claims. (Cl. 260—247.7)

This invention deals with the preparation of 1-phenyl-1-oxo-4-amino-2-alkynes,

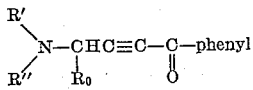

wherein $R_0$ is hydrogen or a monovalent hydrocarbon group and $R'$ and $R''$ are monovalent hydrocarbon groups when taken individually but when taken together constitute a saturated divalent chain which contains four to five carbon atoms and which forms a five- to six-sided heterocycle with the nitrogen. It is preferred that $R_0$ contain not over eight carbon atoms and that $R'$ and $R''$ together contain not over eleven carbon atoms.

The phenyl-oxo-aminoalkynes are prepared by reacting together at 20° to 100° C. a tertiary propargylmonoamine and a benzoate ester in the presence of an anhydrous, strongly basic catalyst. It is preferred that the reaction be effected at temperatures between 30° and 60° C. The reaction is effected by mixing the two reactants and heating them to initiate and complete the reaction in the presence of a strongly basic catalyst. An inert atmosphere is desirable during the reaction. If desired, inert organic solvents, such as benzene, toluene, naphtha, ethyl ether, isopropyl ether, or the like, may be used. When the reaction has been well advanced, the catalyst is destroyed and the reaction products are isolated. They are usually distillable under reduced pressure.

The products are interesting chemical intermediates, having reactive groups of four sorts. They yield, for example, diketones, cyclic compounds, quaternary ammonium compounds, and addition products through the Michael reaction. They thus supply compounds for use in the fields of pharmacy, insecticides, fungicides, coatings, and the like.

The useful benzoates for effecting the reaction with a tertiary propargylamine have the formula Phenyl COOR where R is a lower alkyl group, such as methyl, ethyl, propyl, or butyl. The benzoates of first choice are methyl benzoate and ethyl benzoate. The alcohol, ROH, which is formed in the reaction is usually washed away or distilled away from the desired end-products and should desirably be small. The esters are not confined to those of benzoic acid itself, as the phenyl group may contain such substituents as alkyl, alkoxy, acyl, or halo, all of which are characterized by being non-acidic. Thus there may be used methyl methylbenzoate, methyl butylbenzoate, ethyl chlorobenzoate, and the like.

The tertiary propargylamines which are used have the structure

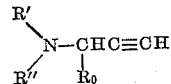

where $R'$, $R''$ and $R_0$ have the significance assigned above. The groups $R'$ and $R''$ may be the same or different and are such groups as methyl, ethyl, propyl, butyl, amyl, hexyl, heptyl, octyl, or decyl in their various configurations, or cycloaliphatic such as cyclohexyl, arylalkyl such as benzyl or methylbenzyl, or aryl such as phenyl butylphenyl or methylphenyl, all as typical of individual hydrocarbon groups. When $R'$ and $R''$ are taken together they form a saturated divalent chain, such as —$CH_2 CH_2 CH_2 CH_2$—,

—$CH_2 CH_2 CH_2 CH_2 CH_2$—

—$CH_2 CH_2 O CH_2$—, or —$CH_2 CH_2 S CH_2 CH_2$—, which occur in the cyclic secondary amines, pyrrolidine, piperidine, morpholine, and thiamorpholine respectively.

The term $R_0$ represents a monovalent hydrocarbon group or hydrogen. Typical hydrocarbon groups are methyl, ethyl, propyl, butyl, hexyl, and the like, whether of straight or branched chain structure, allyl, cyclohexyl, phenyl, or other aliphatic, cycloaliphatic, aryl, or arylaliphatic groups.

The propargylamines are available through the reaction of a secondary amine, an aldehyde, and acetylene, preferably in the presence of a heavy metal of the first or second groups of the periodic table. In particular, copper in the form of such salts as cuprous chloride, copper acetate, or copper formate provides useful catalysts. Temperatures of reaction may be as high as 120° C., depending upon the particular combination of reactants. Additional details of one method of preparation are given in U. S. Patent No. 2,273,141 issued February 17, 1942.

Typical aldehydes for use in this reaction to form propargylamines are formaldehyde, acetaldehyde, propionaldehyde, butyraldehyde, heptaldehyde, 2-ethylhexaldehyde, 3,5,5-trimethylhexaldehyde, benzaldehyde, hexahydrobenzaldehyde, 2-ethylpropylacrolein, and the like. Amines which are useful include dimethylamine, diethylamine, diisopropylamine, diallylamine, dibutylamine, diamylamine, benzylmethylamine, dicyclohexylamine, hexylmethylamine, allylmethylamine, isononylmethylamine, N-methylaniline, etc.

The catalysts for the reaction of propargylamines and benzoates are anhydrous, strongly basic catalysts of two major types, alkali metal acetylides and quaternary ammonium alcoholates, the quaternary ammonium group of which is capable of yielding a strongly basic quaternary ammonium hydroxide. The acetylides include sodium acetylide, potassium acetylide, and alkali metal acetylides of the propargylamines, such as the sodium derivative of 3-dimethylamino-1-propyne. Such alkaline agents as sodium or potassium metal, sodium hydride, or sodium amide are effective, but may be considered equivalent to the acetylides, which are theoretically formed therefrom.

The strongly basic quaternary ammonium alcoholates are particularly desirable for the reaction here involved. They are usually prepared in the form of alcoholates, with one mole of the quaternary ammonium alkoxide to one mole of alcohol. Useful compounds here include tetramethyl ammonium methoxide, trimethyl benzyl ammonium methoxide, ethoxide, or tert. butoxide, dimethyl dibenzyl ammonium methoxide, trimethyl chlorobenzyl ammonium ethoxide, methoxybenzyl trimethyl ammonium ethoxide, etc.

The amount of catalyst for promoting the reaction may vary over a considerable range. Thus, there may be used from one mole or more of catalyst per mole of propargylamine to as little as 1/100 of a mole of catalyst. The preferred range for promoting the reaction in a reasonable time lies between 0.1 mole and one mole of catalyst per mole of propargylamine.

The catalyst is destroyed when the reaction has been well advanced. This is most readily accomplished by addition of acid, such as acetic, hydrochloric, sulfuric, or the like. The mixture is separated and the organic layer is worked up by common steps. Many of the products can be purified by distillation.

Preparation of typical phenyl-oxo-aminoalkynes are shown in the following illustrative examples.

*Example 1.*—1-phenyl-1-oxo-4-dimethylamino-2-butyne.—A mixture of 900 g. (6.0 moles) of ethyl benzoate, 326 g. (1.5 moles) of benzyl trimethyl ammonium ethoxide containing an equivalent of ethanol and 249 g. (3.0 moles) of 3-dimethyl-amino-1-propyne was stirred under an atmosphere of nitrogen and maintained at 38–49° C. for 19 hours. It was then cooled and neutralized by the addition of 90 g. (1.5 moles) of glacial acetic acid in 200 g. of ice water. Layers were allowed to form and were separated. The organic layer was dried over anhydrous potassium carbonate and fractionally distilled. The first fraction which boiled below 34° C./1 mm. consisted of ethanol and 50 g. of unreacted propyne. Ethyl benzoate was recovered in a fraction which boiled at 34–119° C./1 mm. and weighed 689 g. The product was obtained as a fraction which distilled at 119–146° C./1-2 mm. and which weighed 111 g. This is a yield of 43% based on benzoate, 25% based on the propyne, and 40% based on the catalyst. The product on redistillation came over at 119–123° C./0.2 mm., had a refractive index, $n_D^{20}$, of 1.626. It contained by analysis 77.12% of C, 6.83% of H, and 7.45% of N. For 1-phenyl-1-oxo-4-dimethylamino-2-butyne ($C_{12}H_{13}NO$) the corresponding theoretical values are 76.98% of C, 6.99% of H, and 7.49% of N.

Repetition of the above procedure with an equivalent weight of methyl benzoate for the six moles of ethyl benzoate leads to exactly the same end product in a similar yield. Comparably the reaction may be run with methyl methylbenzoate. Thus, 150 grams of methyl methylbenzoate, 50 grams of benzyl trimethyl ammonium ethoxide with one mole of ethyl alcohol, and 75 grams of 3-dimethylamino-1-propyne heated under a nitrogen atmosphere and stirred for 24 hours at 50°–55° C. yields about 40 grams of 1-methylphenyl-1-oxo-4-dimethylamino-2-butyne, which distills at 125°–145° C./1 mm.

*Example 2.*—1-phenyl-1-oxo-4-diethylamino-2-butyne.—A mixture of 300 g. (2.0 moles) of ethyl benzoate, 98 g. (0.4 mole) of benzyl trimethyl ammonium ethoxide containing an equivalent of ethanol, and 45 g. (0.4 mole) of 3-diethylamino-1-propyne under an atmosphere of nitrogen was stirred and heated at 35° for 22 hours. The reaction mixture was then cooled and neutralized by the addition of 24 g. (0.4 mole) of acetic acid in 80 g. of ice water. The resulting organic layer was separated, dried over anhydrous potassium carbonate, and distilled. There was obtained 30 g. of a mixture of ethanol and unreacted propyne which distilled below 40° C./1 mm., 250 g. of unreacted ethyl benzoate which distilled at 63–93° C./1 mm., and 23 g. of product which distilled at 140–170° C./1 mm. The product on redistillation came over at 115–125° C./0.1 mm. It then had a refractive index $n_D^{20}$, of 1.6054 and by analysis contained 77.58% of carbon, 7.68% of hydrogen, and 6.37% of nitrogen. For 1-phenyl-1-oxo-4-diethylamino-2-butyne ($C_{14}H_{17}NO$) theoretical values are 78.10% of carbon, 7.96% of hydrogen, and 6.51% of nitrogen.

In the same general way other dialkylamino-propynes up to 3-diamyl-1-propyne can be satisfactorily reacted with a lower alkyl benzoate to yield 1-phenyl-1-oxo-4-dialkylamino-2-butynes. When larger alkylamino groups are desired, it is best to use mixed groups such as methyl and hexyl, methyl and octyl, methyl and nonyl, or ethyl and nonyl. The reaction is likewise effective when the N-substituents are aryl, aralkyl, or cycloalkyl or any two of the various types of hydrocarbon groups. Yet another sub-class of phenyl-oxo-aminoalkynes is obtained when the amino nitrogen is part of a cyclic amine. The reaction is carried on in essentially the same way as will be seen from the following examples.

*Example 3.*—1-phenyl-1-oxo-4-(N-morpholino)-2-butyne.—A mixture of 400 g. (6.0 moles) of ethyl benzoate, 375 g. (3.0 moles) of 3-(N-morpholino)-1-propyne and 1.5 moles of benzyl trimethyl ammonium ethoxide containing an equivalent of ethanol under an atmosphere of nitrogen was stirred and heated at 35° for 20 hours. The reaction mixture was cooled and neutralized by the addition of 90 g. (1.5 moles) of acetic acid in 200 ml. of ice water and mixed with 500 ml. of benzene. The resulting organic layer was separated and dried over anhydrous calcium sulfate. It was distilled to give 799 g. of unreacted propyne and benzoate which distilled at 40–110° C./1 mm. and 77 g. of 1-phenyl-1-oxo-4-(N-morpholino)-2-butyne which was obtained at head temperatures of 110–220° C./1–2.4 mm. The residue weighed 262 g. The product on redistillation came over at 150–165° C./0.1 mm. It had a refractive index, $n_D^{20}$, of 1.6051. It crystallized when cooled to a mushy solid. The product as thus obtained contained by analysis 6.59% of nitrogen. For $C_{14}H_{15}NO_2$ the theoretical nitrogen content is 6.11%.

A mixture of 0.5 mole of the sodium salt of 3-(N-morpholino)-1-propyne, 272 g. (2.0 moles) of methyl benzoate and 63 g. (0.5 mole) of 3-(N-morpholino)-1-propyne was stirred and heated at 27°–54° C. for 10 hours. The reaction mixture was worked up as above to yield 40 g. of product, which corresponded in all respects with the product as obtained immediately above.

*Example 4.—1 - phenyl -1- oxo -4- morpholino-6,6,8-trimethyl-2-nonyne.*—A mixture of 47.4 g. (0.2 mole) of 5,7,7-trimethyl-3-(N-morpholino)-1-octyne, 150 g. (1.0 mole) of ethyl benzoate and 35 g. (0.14 mole) of benzyl trimethyl ammonium ethoxide which contained an equivalent of ethanol under an atmosphere of nitrogen was stirred and heated at 38–39° for 20 hours. The reaction mixture was cooled and neutralized by the addition of 8.7 g. (0.14 mole) of acetic acid in 40 ml. of ice water. Layers were allowed to form and were separated. The organic layer was dried over anhydrous potassium carbonate and distilled. There was obtained 127 g. of the unreacted octyne and the benzoate which boiled at 49–96° C./0.1 mm. There was then obtained 10 g. of product at 110–212° C./0.4 mm. It was redistilled at 205–210° C./0.15 mm. and then had a refractive index, $n_D^{20}$, of 1.5350 and contained by anaylsis 3.36% of nitrogen. For phenyl-1-oxo - 4 - (N-morpholino) - 6,6,8 - trimethyl - 2-nonyne ($C_{24}H_{37}NO_3$) the theoretical nitrogen content is 3.60%. The formula for this compound may be represented

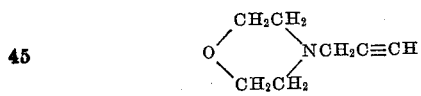

In place of the N-morpholino compounds shown just above there may be used thiamorpholino, pyrrolidino, or piperidino compounds with like effect. The end-products are 1-phenyl-1-oxo-4-amino-2-butynes when $R_0$ is hydrogen or corresponding 2-alkynes when $R_0$ is a hydrocarbon group instead of hydrogen. Thus, the product from 3-(N-pyrrolidino)-1-propyne and methyl benzoate, reacted in the presence of benzyl trimethylammonium ethoxide at 30°–40° C., is 1-phenyl - 1 - oxo - 4 - (N - pyrrolidino)-2-butyne.

The reaction with neutrally substituted benzoates proceeds in the same way as shown for methyl and ethyl benzoates. The phenyl group in these cases retains the substituent.

We claim:

1. A process which comprises reacting together at 20° to 100° C. in the presence of an anhydrous strongly basic catalyst selected from the class consisting of strongly basic quaternary ammonium alkoxides, and alkali metal acetylides an ester

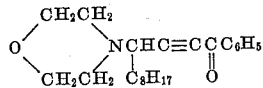

where R is a lower alkyl group, and a propargyl-monoamine

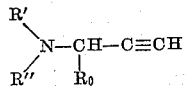

where $R_0$ is selected from the class consisting of hydrogen and hydrocarbon groups of not over eight carbon atoms, and R' and R'' are monovalent hydrocarbon groups totaling not over eleven carbon atoms when taken individually and when taken together form a divalent saturated chain selected from the class consisting of

—$CH_2CH_2CH_2CH_2$—
—$CH_2CH_2CH_2CH_2CH_2$—
—$CH_2CH_2OCH_2CH_2$— and

—$CH_2CH_2SCH_2CH_2$— which jointly with the nitrogen forms a heterocycle, destroying the catalyst, and separating a compound of the formula

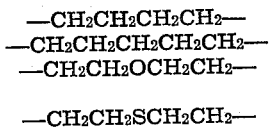

where $R_0$, R' and R'' have the above significance.

2. A process which comprises reacting together at 30° to 60° C. in the presence of an anhydrous strongly basic quaternary ammonium alkoxide ethyl benzoate and a propargylamine

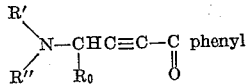

neutralizing the quaternary ammonium alkoxide, and separating 1 - phenyl - 1 - oxo - 4 - dimethylamino-2-butyne.

3. A process which comprises reacting together at 30° to 60° C. in the presence of an anhydrous strongly basic quaternary ammonium alkoxide ethyl benzoate and a propargylamine.

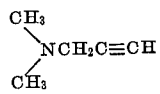

neutralizing the quaternary ammonium alkoxide, and separating 1-phenyl-1-oxo-4-(N-morpholino)-2-butyne.

4. A process which comprises reacting together at 30° to 60° C. in the presence of benzyl trimethyl ammonium ethoxide as catalyst 5,7,7-trimethyl-3(N-morpholino)-1-octyne and ethyl benzoate, neutralizing the ammonium ethoxide, and separating 1-phenyl -1- oxo -4- (N-morpholino)-6,6,8-trimethyl-2-nonyne.

5. Compounds of the formula

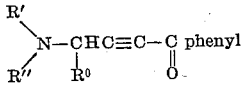

where $R_0$ is selected from the class consisting of hydrogen and monovalent hydrocarbon groups of not over eight carbon atoms, R' and R'' are monovalent hydrocarbon groups totaling not over eleven carbon atoms when taken individually and when taken together form a divalent saturated chain selected from the class consisting of

—$CH_2CH_2CH_2CH_2$—
—$CH_2CH_2CH_2CH_2CH_2$—
—$CH_2CH_2OCH_2CH_2$— and

—$CH_2CH_2SCH_2CH_2$— which jointly with the nitrogen forms a heterocycle.

6. As a new chemical compound, 1-phenyl-1-oxo-4-dimethylamino-2-butyne.

7. As a new chemical compound, 1-phenyl-1-oxo-4-(N-morpholino)-2-butyne.

8. As a new chemical compound, 1-phenyl-1-oxo - 4 - (N-morpholino) - 6,6,8 - trimethyl -2-nonyne.

JOHN O. VAN HOOK.
WILLARD J. CROXALL.

REFERENCES CITED

The following references are of record in the file of this patent:

UNITED STATES PATENTS

| Number | Name | Date |
|---|---|---|
| 2,110,199 | Hume | Mar. 8, 1938 |
| 2,273,141 | Reppe et al. | Feb. 17, 1942 |